W. G. A. BONWILL.
Dental-Drills and Lathes.
No. 148,920.                Patented March 24, 1874.
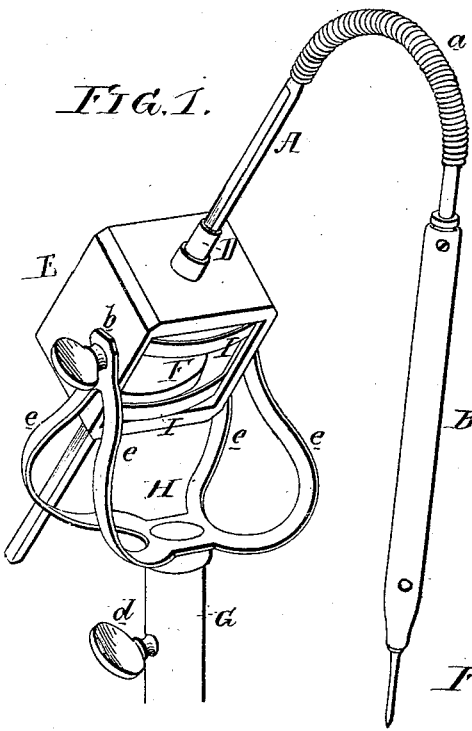
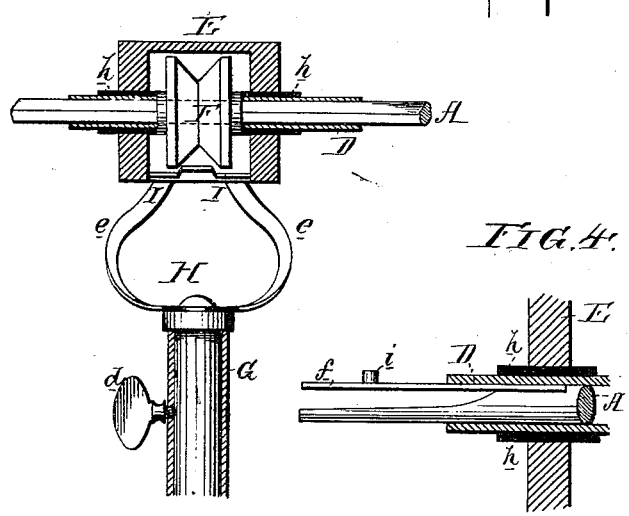
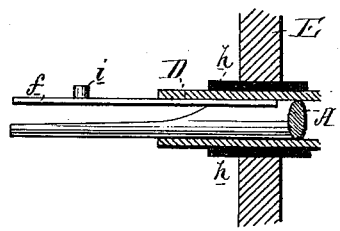
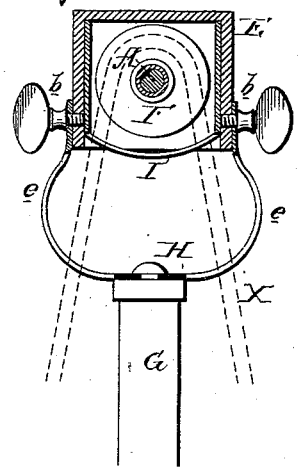

UNITED STATES PATENT OFFICE.

WILLIAM G. A. BONWILL, OF PHILADELPHIA, PENNSYLVANIA.

IMPROVEMENT IN DENTAL DRILLS AND LATHES.

Specification forming part of Letters Patent No. 148,920, dated March 24, 1874; application filed September 13, 1873.

*To all whom it may concern:*

Be it known that I, WILLIAM G. A. BONWILL, of the city and county of Philadelphia, State of Pennsylvania, have invented an Improved Dental Drill and Lathe, of which the following is a specification:

The object of my invention is to accomplish the various operations of drilling, grinding, polishing, &c., required in dentistry, with economy of time and labor to the dentist and with ease and comfort to the patient.

I attain this object by the use of the combined drill and lathe best observed in the perspective view, Figure 1 of the accompanying drawing. The drill-rod A, to which the tool B is attached by a flexible spiral connection, a, sliding through, but not turning independently of, a hollow spindle, D, to which grinding or polishing wheels can be attached, and on which, within a box, E, is a grooved pulley, F, driven by a band from a large pulley attached to a pedestal, G, the latter supporting a frame, H, capable of rotating on the same, and to which the box E is pivoted, at b b, the said box and the drill-rod having consequently an universal movement without risk of throwing the band off the pulley F, which is provided with guards I. The pedestal G is secured to any suitable base, upon or adjacent to which is a large grooved driving-pulley, operated by a treadle and pitman or otherwise, the band x from the pulley passing between the arms e e of the frame H, and around the small grooved pulley F on the hollow spindle D, which is thus rapidly driven, as indicated by dotted lines in the transverse sectional elevation, Fig. 2.

As the frame H can be rotated in a horizontal plane upon the top of the pedestal G, and as the box E, carrying the spindle and pulley, can also be turned upon its pivots or trunnions b on the said frame, it follows that the said spindle and pulley are capable of almost universal adjustment, and to prevent the driving-band from slipping off the said pulley during its various movements, I arrange at either side of the same, within the box E, a curved guard, I. (Best observed in Fig. 1, and in the longitudinal section, Fig. 3.) The hollow spindle D turns in long bearings h, preferably of steel, and projects beyond the same and the box E at both ends. An internal projection of the said hollow spindle is adapted to the flattened side of the drill-rod A, and thus prevents the latter from turning independently without interfering with its free longitudinal sliding movement at any rate of speed of the spindle.

To prevent the accidental withdrawal of the drill-rod from the spindle, the former is provided, near one end, with a stop-pin, i; (see enlarged view, Fig. 4,) but the said pin is attached to a spring, f, on compressing which the rod may be drawn entirely through the spindle.

The universal adjustability and longitudinal movement of a drill, burr, or other tool, B, attached to the end of the rod A, especially when a flexible connection, a, is used, enables the various operations upon the teeth, such as cutting tooth substance and metal fillings, and polishing any part of the teeth or fillings, to be performed with facility, the apparatus being also efficient for drilling in metals, wood, bone, &c., in the fitting up of light work, dental or otherwise.

When the apparatus is to be used as a laboratory drill or lathe, the box E, with its spindle and pulley, is adjusted to a horizontal position, and is, with the frame H, rigidly secured to the pedestal G by means of the set-screws b and d, the rod A being then withdrawn and drills or burrs attached to the spindle; or, if instruments are to be sharpened, or sets of teeth ground, corundum wheels may be fitted to the projecting ends of the hollow spindle D.

I claim as my invention—

1. In a dental drill, the combination of a rotating hollow spindle, to which power is applied, and a drill-rod rotating with and longitudinally adjustable in the spindle, substantially as set forth.

2. The combination, substantially as described, with the sliding drill-rod A and universally-adjustable spindle D, of a tool, B, and flexible connection a.

3. The combination, substantially as described, of the standard G, the frame H, rendered adjustable thereon, and the box E carrying the spindle D and its pulley, and capable of adjustment on the said frame.

4. The combination, with the standard G, frame H, and box E, of set-screws $d$ and $b$, whereby the whole may be converted into a rigid structure, for the purpose specified.

5. The combination, substantially as described, with the universally-adjustable pulley F, of guards I I, for the purpose specified.

6. The combination, substantially as described, of the spring-catch $f$ at the end of the drill-rod, with the hollow spindle D.

In testimony whereof I have signed my name to this specification in the presence of two subscribing witnesses.

WM. G. A. BONWILL.

Witnesses:
    WM. A. STEEL,
    HUBERT HOWSON.